US011762142B2

(12) United States Patent
Chen

(10) Patent No.: US 11,762,142 B2
(45) Date of Patent: Sep. 19, 2023

(54) BACKLIGHT MODULE AND LIGHTING KEYBOARD

(71) Applicant: DARFON ELECTRONICS CORP., Taoyuan (TW)

(72) Inventor: Chao-Yu Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/077,214

(22) Filed: Dec. 7, 2022

(65) Prior Publication Data

US 2023/0194768 A1 Jun. 22, 2023

Related U.S. Application Data

(60) Provisional application No. 63/291,470, filed on Dec. 20, 2021.

(30) Foreign Application Priority Data

Nov. 23, 2022 (TW) ................................. 111144809

(51) Int. Cl.
    *F21V 8/00* (2006.01)
(52) U.S. Cl.
    CPC ......... *G02B 6/0045* (2013.01); *G02B 6/0036* (2013.01)
(58) Field of Classification Search
    CPC .... G02B 6/0031; G02B 6/0088; G02B 6/005; G02B 6/0055; G02B 6/0045; G02B 6/0036; H01H 13/023; H01H 2219/044; H01H 2219/062; H01H 2219/06
    See application file for complete search history.

(56) References Cited

U.S. PATENT DOCUMENTS

| | | | | |
|---|---|---|---|---|
| 2009/0140891 A1* | 6/2009 | Ragusa | .................. | H01H 13/83 341/31 |
| 2012/0275193 A1* | 11/2012 | Yoshida | ............... | G02B 6/0018 362/613 |
| 2019/0371538 A1* | 12/2019 | Huang | ................. | G02B 6/0068 |

FOREIGN PATENT DOCUMENTS

| | | | |
|---|---|---|---|
| CN | 201758091 U | * | 3/2011 |
| TW | M321552 | | 11/2007 |
| TW | 201419343 A | | 5/2014 |

* cited by examiner

*Primary Examiner* — Fatima N Farokhrooz
(74) *Attorney, Agent, or Firm* — Winston Hsu

(57) ABSTRACT

A backlight module is disposed under a plurality of keyswitches of a lighting keyboard. The backlight module includes a lighting chip and a light guide plate. The lighting chip has a first illumination unit and a second illumination unit arranged side by side. The light guide plate has a hole structure where inside the lighting chip is disposed. A lateral side of the hole structure facing an illumination surface of the lighting chip includes a first area and a second area formed in a non-linear manner, respectively corresponding to the first illumination unit and the second illumination unit. The first area guides a first output beam of the first illumination unit toward the second area. The second area guides a second output beam of the second illumination unit toward the first area.

18 Claims, 6 Drawing Sheets

BACKLIGHT MODULE AND LIGHTING KEYBOARD

CROSS REFERENCE TO RELATED APPLICATIONS

This application claims the benefit of U.S. Provisional Application No. 63/291,470, filed on Dec. 20, 2021. The content of the application is incorporated herein by reference.

BACKGROUND OF THE INVENTION

1. Field of the Invention

The present invention relates to a backlight module and a lighting keyboard, and more particularly, to a backlight module having a shortest light mixing distance and a related lighting keyboard.

2. Description of the Prior Art

Please refer to FIG. 6. FIG. 6 is an application diagram of a backlight module 60 and a lighting chip 62 in prior art. The lateral side of the hole of the backlight module 60 used to accommodate the lighting chip 62 is a straight side shape. Beams with different colors emitted by illumination units of the lighting chip 62 are mixed at a distance far from the lighting chip 62. For example, the illumination range drawn in grid is represented as different color beams emitted by the illumination units, such as the red beam, the blue beam and the yellow beam; the illumination range drawn in dots is represented as the white beam formed by mixing of the foresaid color beams. Generally, the light mixing extension distance in prior art is about 7 mm to 15 mm, which easily results in chromatic aberration, and the chromatic aberration is more obvious in position close to the lighting chip 62.

SUMMARY OF THE INVENTION

The present invention provides a backlight module having a shortest light mixing distance and a related lighting keyboard for solving above drawbacks.

According to the claimed invention, a backlight module is disposed under a plurality of keyswitches of a lighting keyboard. The backlight module includes a lighting chip and a light guide plate. The lighting chip includes a first illumination unit and a second illumination unit arranged side by side. The light guide plate includes a hole structure where inside the lighting chip is disposed. A lateral side of the hole structure facing an illumination surface of the lighting chip includes a first area and a second area formed in a non-linear manner. The first area and the second area respectively correspond to the first illumination unit and the second illumination unit. The first area guides a first output beam emitted by the first illumination unit toward the second area, and the second area guides a second output beam emitted by the second illumination unit toward the first area.

According to the claimed invention, a lighting keyboard includes a plurality of keyswitches and a backlight module. The backlight module is disposed under the plurality of keyswitches of a lighting keyboard. The backlight module includes a lighting chip and a light guide plate. The lighting chip includes a first illumination unit and a second illumination unit arranged side by side. The light guide plate includes a hole structure where inside the lighting chip is disposed. A lateral side of the hole structure facing an illumination surface of the lighting chip includes a first area and a second area formed in a non-linear manner. The first area and the second area respectively correspond to the first illumination unit and the second illumination unit. The first area guides a first output beam emitted by the first illumination unit toward the second area, and the second area guides a second output beam emitted by the second illumination unit toward the first area.

The backlight module of the present invention can design the first area, the second area and the third area of the lateral side of the hole structure within the light guide plate, which is used to accommodate the lighting chip and faces the illumination surface of the lighting chip, as the arc curve, or the aspheric shape or the hyperbolic shape mentioned as above; an actual shape of the first area, the second area and the third area is not limited to the foresaid embodiment. An intersection of the arc curve and other straight lateral sides of the hole structure can be chamfered. The first area located on the left side of the hole structure can guide the output beam toward the right side, and the second area located on the right side of the hole structure can guide the output beam toward the left side, and the third area located on the middle of the hole structure can optionally expand the beam angle of the lighting chip, so that the illumination units of the lighting chip can be uniformly mixed in the very short distance.

In conclusion, the backlight module and the lighting keyboard of the present invention can adjust a curvature of the lateral side of the hole structure to improve the light mixing effect of the lighting chip for more uniform and avoiding chromatic aberration, in accordance with a light distribution curve and usage requirement of the lighting chip. The light mixing function of the lighting chip is not limited to the two-color light mixing embodiment or the three-color light mixing embodiment, and depends on the design demand. The light mixing extension distance in the prior art is about 7 mm to 15 mm; comparing to the prior art, the present invention can greatly shorten the light mixing extension distance to less than 2 mm, thereby reducing the waste of mechanical space and product weight.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
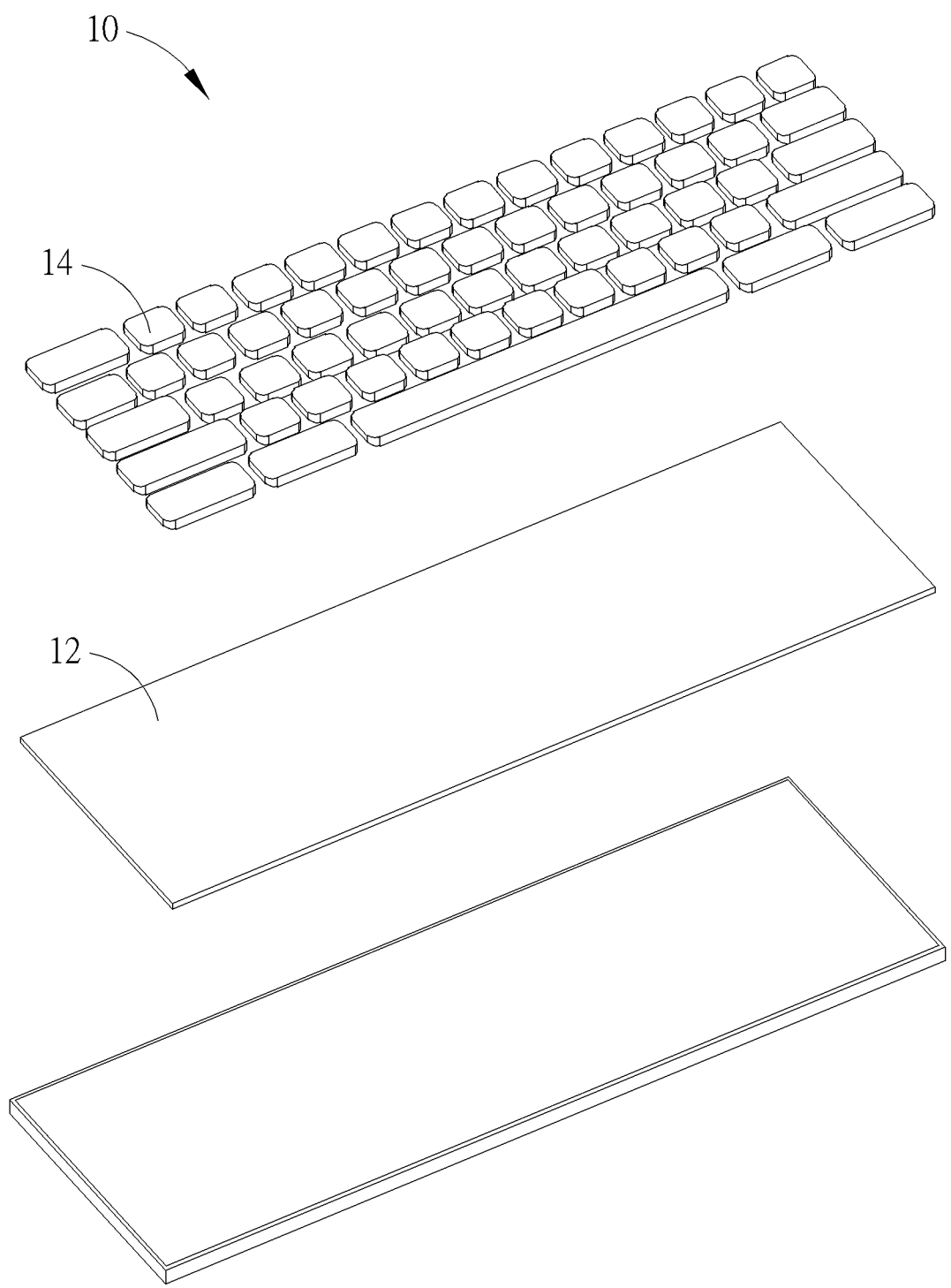
FIG. 1 is a diagram of a lighting keyboard according to an embodiment of the present invention.
Figure 2:
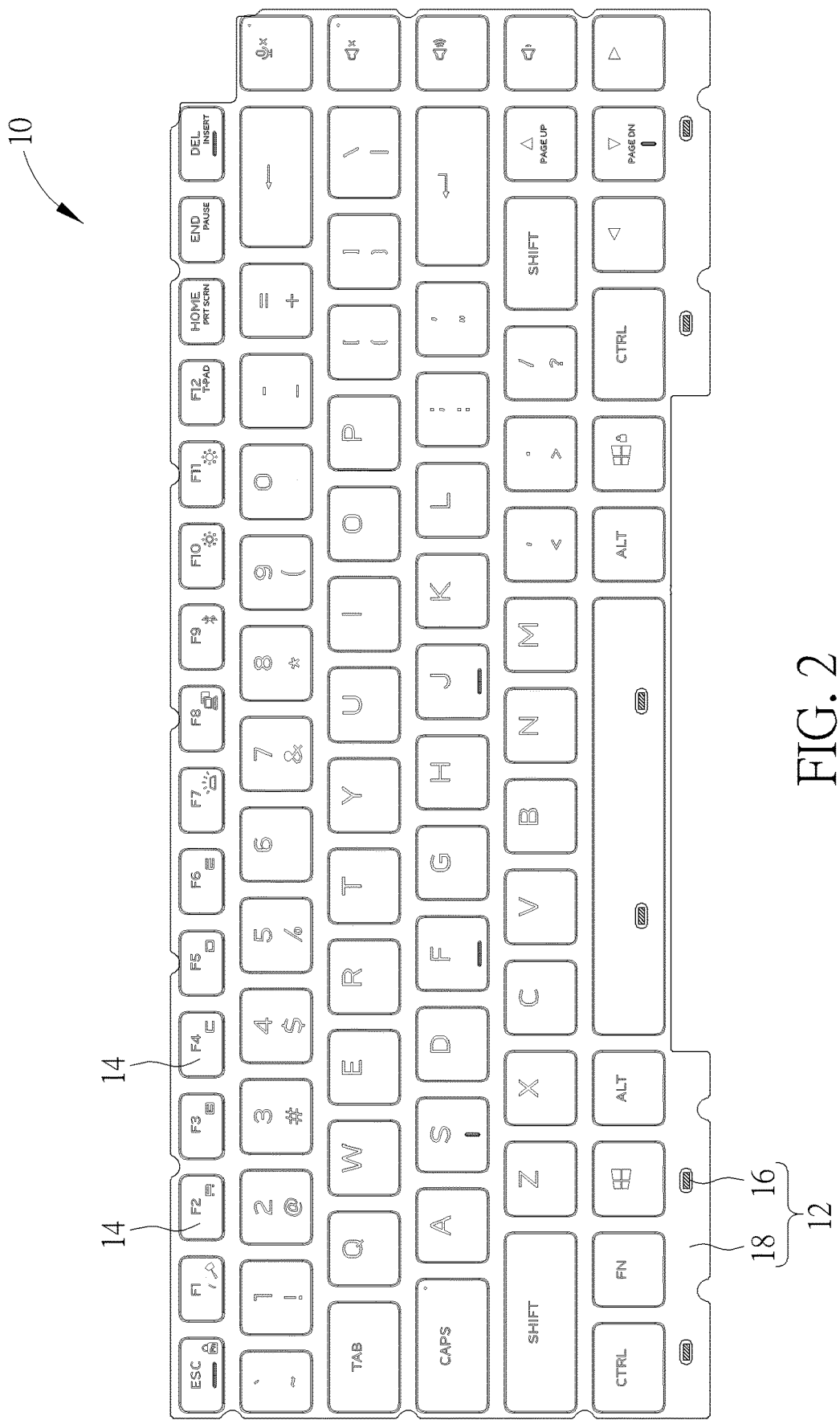
FIG. 2 is a partial diagram of the lighting keyboard according to the embodiment of the present invention.

Please refer to FIG. 1 and FIG. 2. FIG. 1 is a diagram of a lighting keyboard 10 according to an embodiment of the present invention. FIG. 2 is a partial diagram of the lighting keyboard 10 according to the embodiment of the present invention. The lighting keyboard 10 can include a backlight module 12 and a plurality of lighting keyswitches 14. A number and arrangement of the lighting keyswitch 14 can depend on a design demand of the lighting keyboard 10, and a detailed description is omitted herein for simplicity. Each lighting keyswitch 14 can include a substrate, a thin film circuit board, a keycap, a lifting mechanism and a resilient recovering component. The keycap can have a character or a symbol. The thin film circuit board can have a switch. The lifting mechanism can be movably disposed on the substrate and used to move the keycap upwardly and downwardly to actuate or be distant from the switch. A resilient recovering force stored in compression of the resilient recovering component can be released to move the keycap back to an original position.

Figure 3:
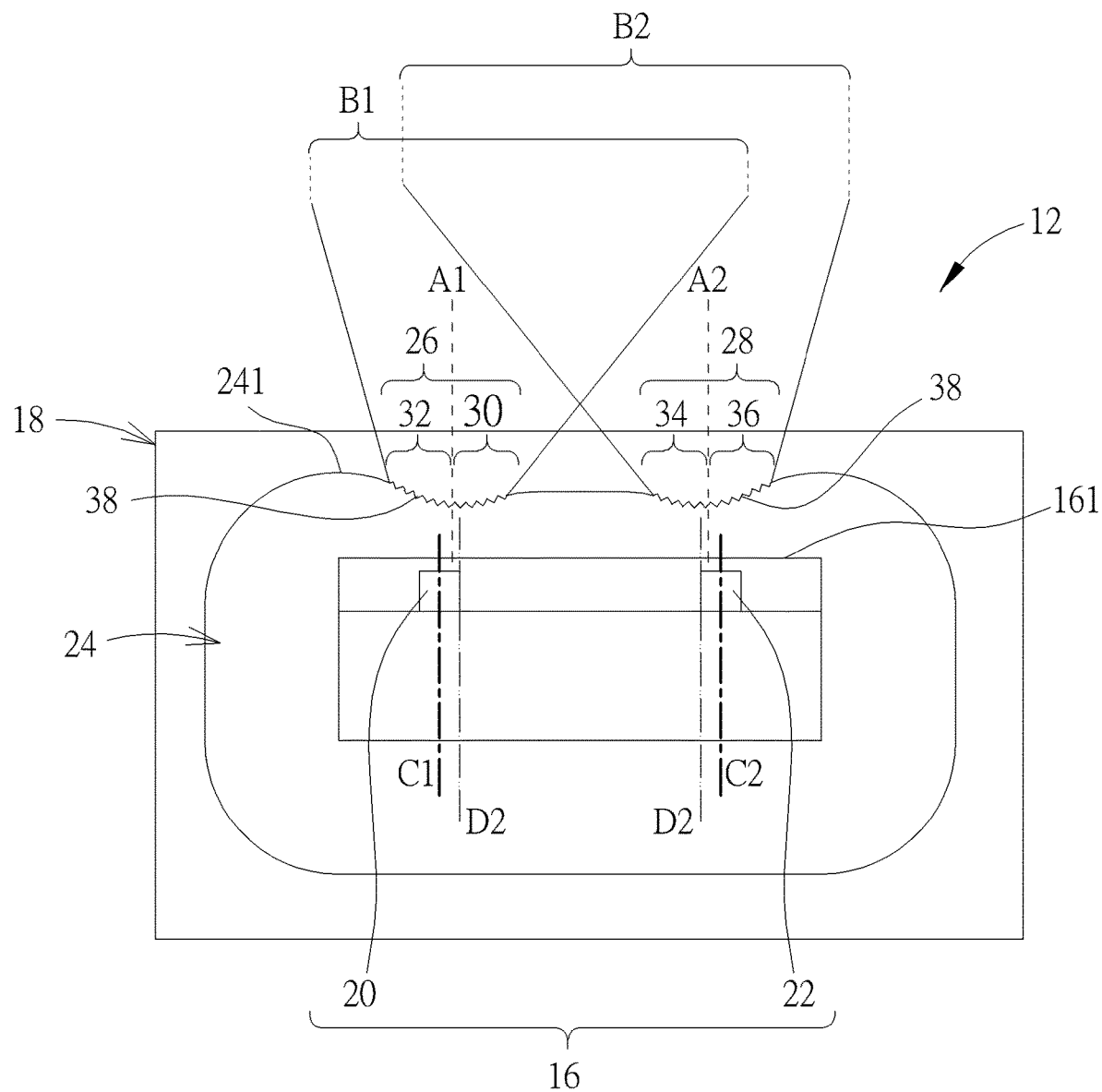
FIG. 3 is a diagram of a backlight module according to the embodiment of the present invention.

Please refer to FIG. 2 and FIG. 3. FIG. 3 is a diagram of the backlight module 12 according to the embodiment of the present invention. The backlight module 12 can be disposed under the plurality of lighting keyswitches 14. The backlight module 12 can include a lighting chip 16 and a light guide plate 18. The lighting chip 16 can include a first illumination unit 20 and a second illumination unit 22 arranged side by side. The light guide plate 18 can include a hole structure 24 used to accommodate the lighting chip 16. A shape of the hole structure 24 is not limited to the embodiment shown in FIG. 3 and depends on the design demand. The first illumination unit 20 and the second illumination unit 22 can emit beams with different colors outwardly. An illumination direction of the illumination unit can correspond to an illumination surface 161 of the lighting chip 16. A lateral side 241 of the hole structure 24 facing the illumination surface 161 of the lighting chip 16 can at least include a first area 26 and a second area 28 formed in a non-linear manner. The first area 26 and the second area 28 can respectively correspond to the first illumination unit 20 and the second illumination unit 22. The foresaid non-linear manner can be interpreted as an edge curve of the first area 26 and the second area 28 from the top view.

The first area 26 can guide a first output beam B1 emitted by the first illumination unit 20 toward the second area 28. The first area 26 can be at least divided into a first divergent part 30 and a first convergent part 32. A boundary A1 between the first divergent part 30 and the first convergent part 32 can point toward a position between a central axle C1 of the first illumination unit 20 and an adjacent edge D1 of the second illumination unit 22. A combination of the first divergent part 30 and the first convergent part 32 of the first area 26 can be an aspheric shape or a hyperbolic shape, and an actual shape can depend on the design demand. The first divergent part 30 can guide the first output beam B1 toward the second area 28, and the first convergent part 32 can guide the first output beam B1 toward the front of the lighting chip 16.

The second area 28 can guide a second output beam B2 emitted by the second illumination unit 22 toward the first area 26. The second area 28 can be at least divided into a second divergent part 34 and a second convergent part 36. A boundary A2 between the second divergent part 34 and the second convergent part 36 can point toward a position between a central axle C2 of the second illumination unit 22 and an adjacent edge D2 of the first illumination unit 20. A combination of the second divergent part 34 and the second convergent part 36 of the second area 28 can optionally be the aspheric shape or the hyperbolic shape, which may be the same as or different from the shape of the first divergent part 30 and the first convergent part 32, and the actual shape can depend on the design demand. The second divergent part 34 can guide the second output beam B2 toward the first area 26, and the second convergent part 36 can guide the second output beam B2 toward the front of the lighting chip 16.

Therefore, design of the first area 26 and the second area 28 within the hole structure 24 of the light guide plate 18 can guide the first output beam B1 and the second output beam B2 to mix each other in a very short distance in front of the lighting chip 16, for achieving a light mixing effect. Besides, the light guide plate 18 can optionally include a microstructural layer 38 disposed on the lateral side 241 of the hole structure 24. The microstructural layer 38 can be mainly distributed within a range of the first area 26 and the second area 28, and used to diffuse the first output beam B1 and the second output beam B2, so that the first output beam B1 and the second output beam B2 can be mixed each other in the very short distance for the light uniformly mixing effect.

Figure 4:
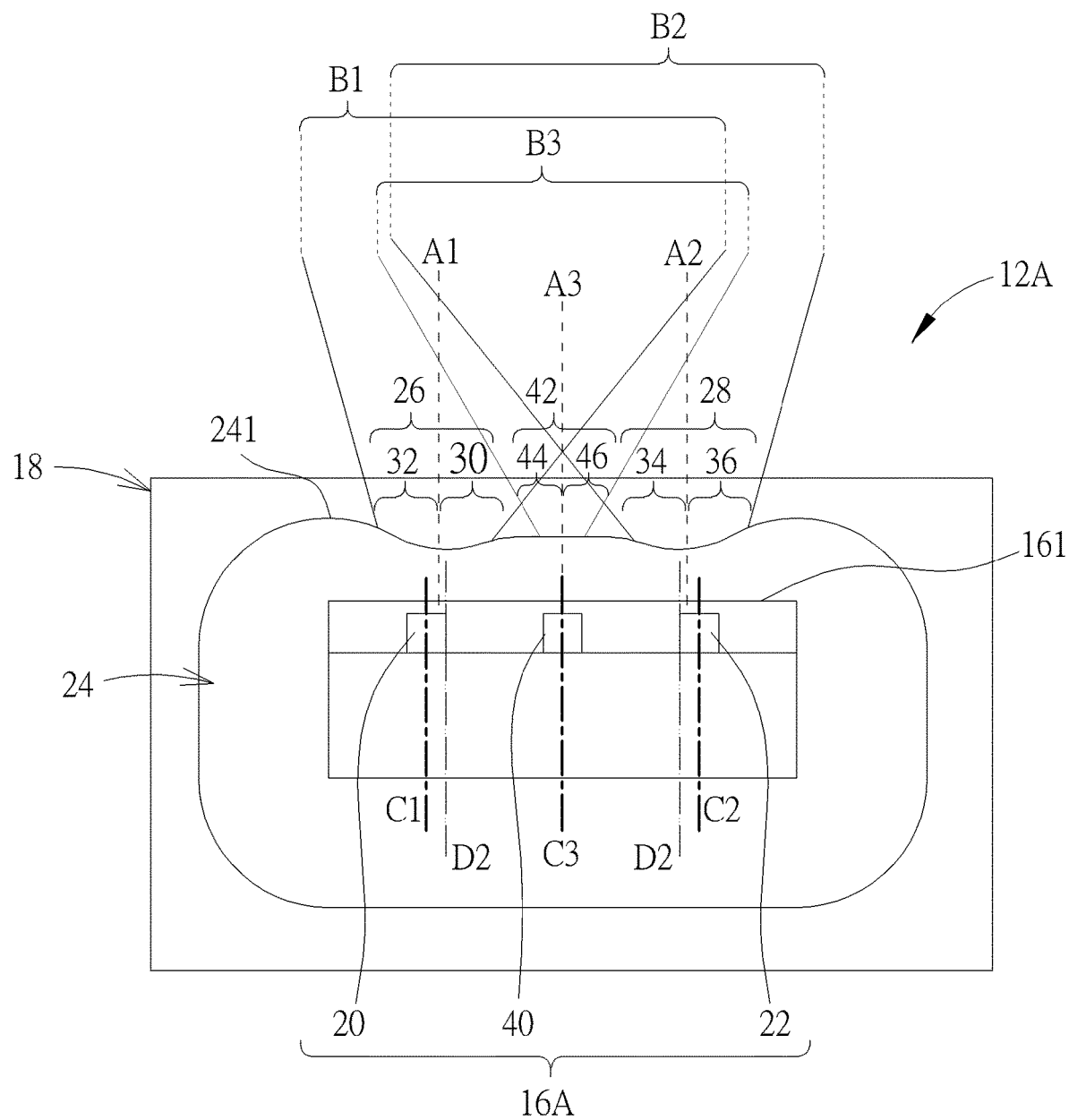
FIG. 4 is a diagram of the backlight module according to another embodiment of the present invention.

Please refer to FIG. 4. FIG. 4 is a diagram of the backlight module 12A according to another embodiment of the present invention. In this embodiment, elements having the same numerals as ones of the foresaid embodiment have the same structures and functions, and the detailed description is omitted herein for simplicity. The lighting chip 16A of the backlight module 12A can further include a third illumination unit 40 located between the first illumination unit 20 and the second illumination unit 22. Accordingly, the lateral side 241 of the hole structure 24 can further include a third area 42 located between the first area 26 and the second area 28 and corresponding to the third illumination unit 40. The third illumination unit 40 can emit the third output beam B3 toward the third area 42, and can be mixed with the first output beam B1 and the second output beam B2 in the very short distance for the light uniformly mixing effect.

The third area 42 can be a plane shape or an arc shape. If the third area 42 is the plane shape, the third output beam B3 can be emitted in accordance with a beam angle of the third illumination unit 40, and the third output beam B3 may be slightly refracted due to the plane shape of the third area 42. If the third area 42 is the arc shape, the third area 42 can optionally include two light guiding parts 44 and 46. The light guiding parts 44 and 46 can be the aspheric shape or the hyperbolic shape, which depends on the design demand. The light guiding parts 44 and 46 can guide the third output beam B3 emitted by the third illumination unit 40 respectively toward the first area 26 and the second area 28, so as to mix with the first output beam B1 and the second output beam B2. In the embodiment, a boundary A3 between the two light guiding parts 44 and 46 can point toward a central axle C3 of the third illumination unit 40, which means the boundary A3 may align with the central axle C3, or misalignment error of the boundary A3 and the central axle C3 is smaller than a preset threshold.

Figure 5:
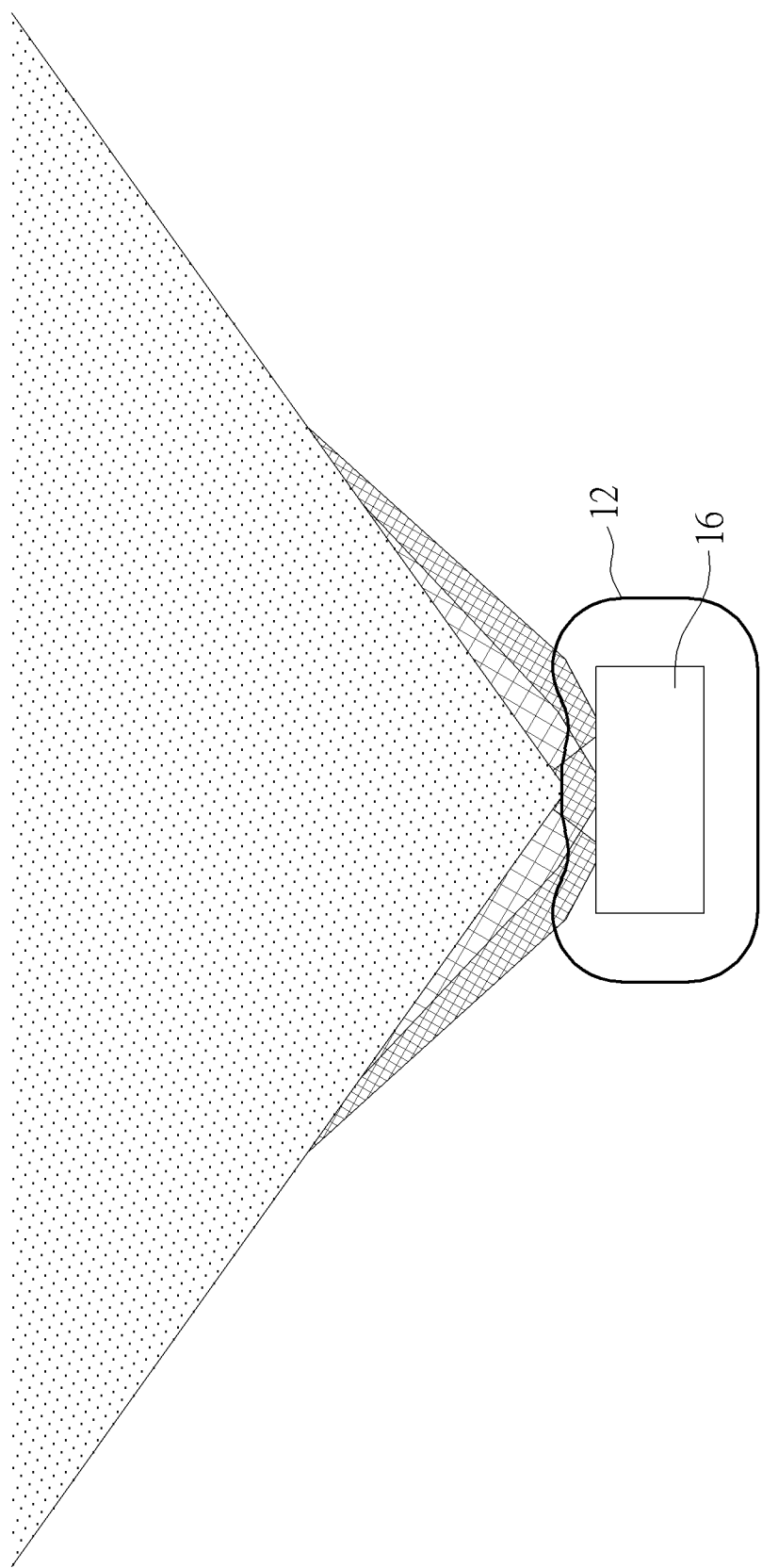
FIG. 5 is an application diagram of the backlight module according to the embodiment of the present invention.
Figure 6:
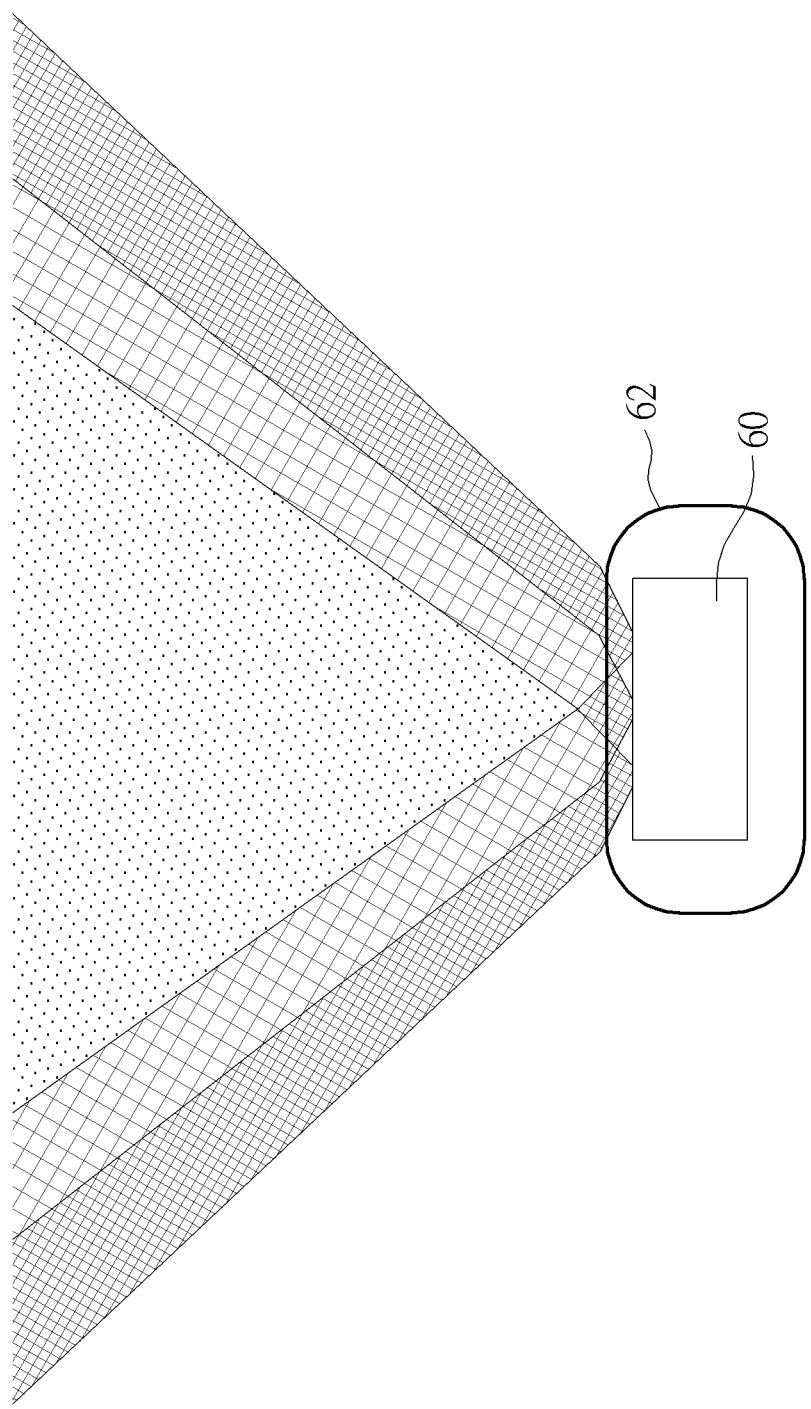
FIG. 6 is an application diagram of a backlight module and a lighting chip in prior art.

Please refer to FIG. 5. FIG. 5 is an application diagram of the backlight module 12 according to the embodiment of the present invention. As shown in FIG. 5, the output beams with several colors (which means an illumination range drawn in grid) emitted by the lighting chip 16 can complete a light mixing function within a light mixing extension distance about 2 mm in front of the lighting chip 16, so that the white beam (which means an illumination range drawn in dots) can be emitted to illuminate the lighting keyswitch 14. Thus, the lighting chips 16 installed in the bottom of the lighting keyboard 10 can illuminate the plurality of lighting keyswitches 14, as the embodiment shown in FIG. 2.

The backlight module of the present invention can design the first area, the second area and the third area of the lateral side of the hole structure within the light guide plate, which is used to accommodate the lighting chip and faces the illumination surface of the lighting chip, as the arc curve, or the aspheric shape or the hyperbolic shape mentioned as above; an actual shape of the first area, the second area and the third area is not limited to the foresaid embodiment. An intersection of the arc curve and other straight lateral sides of the hole structure can be chamfered. The first area located on the left side of the hole structure can guide the output beam toward the right side, and the second area located on the right side of the hole structure can guide the output beam toward the left side, and the third area located on the middle of the hole structure can optionally expand the beam angle of the lighting chip, so that the illumination units of the lighting chip can be uniformly mixed in the very short distance.

In conclusion, the backlight module and the lighting keyboard of the present invention can adjust a curvature of the lateral side of the hole structure to improve the light mixing effect of the lighting chip for more uniform and avoiding chromatic aberration, in accordance with a light distribution curve and usage requirement of the lighting chip. The light mixing function of the lighting chip is not limited to the two-color light mixing embodiment or the three-color light mixing embodiment, and depends on the design demand. The light mixing extension distance in the prior art is about 7 mm to 15 mm; comparing to the prior art, the present invention can greatly shorten the light mixing extension distance to less than 2 mm, thereby reducing the waste of mechanical space and product weight.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module disposed under a plurality of keyswitches of a lighting keyboard, the backlight module comprising:
    a lighting module, comprising a first illumination unit and a second illumination unit arranged side by side; and
    a light guide plate, comprising a hole structure wherein the lighting module is disposed within the hole structure, a lateral side of the hole structure facing an illumination surface of the lighting module comprising a first area and a second area formed in a non-linear manner, the first area and the second area respectively corresponding to the first illumination unit and the second illumination unit, a first output beam from the first area emitting towards the second area, and a second output beam from the second area emitting towards the first area;
    wherein a first central optical axis of the first output beam is intersected with a central boundary between the first illumination unit and the second illumination unit, and a second central optical axis of the second output beam is intersected with the central boundary.

2. The backlight module of claim 1, wherein the first area comprises a first divergent part and a first convergent part, a boundary of the first divergent part and the first convergent part points toward a position between a central axle of the first illumination unit and an adjacent edge of the second illumination unit.

3. The backlight module of claim 1, wherein the second area comprises a second divergent part and a second convergent part, a boundary of the second divergent part and the second convergent part points toward a position between a central axle of the second illumination unit and an adjacent edge of the first illumination unit.

4. The backlight module of claim 1, wherein at least one area of the first area and the second area is an aspheric shape or a hyperbolic shape.

5. The backlight module of claim 1, wherein the light guide plate further comprises a microstructural layer disposed on the lateral side of the hole structure, and used to diffuse the first output beam and the second output beam.

6. The backlight module of claim 1, wherein the lighting module further comprises a third illumination unit located between the first illumination unit and the second illumination unit, the lateral side of the hole structure further comprises a third area located between the first area and the second area and corresponding to the third illumination unit.

7. The backlight module of claim 6, wherein the third area is a plane shape or an arc shape.

8. The backlight module of claim 6, wherein the third area comprises two light guiding parts adapted to guide a third output beam emitted by the third illumination unit respectively toward the first area and the second area.

9. The backlight module of claim 8, wherein a boundary of the two light guiding parts aligns with a central axle of the third illumination unit.

10. A lighting keyboard, comprising:
    a plurality of keyswitches; and
    a backlight module disposed under the plurality of keyswitches of a lighting keyboard, the backlight module comprising
        a lighting module, comprising a first illumination unit and a second illumination unit arranged side by side; and
        a light guide plate, comprising a hole structure wherein the lighting module is disposed within the hole structure, a lateral side of the hole structure facing an illumination surface of the lighting module comprising a first area and a second area formed in a non-linear manner, the first area and the second area respectively corresponding to the first illumination unit and the second illumination unit, a first output beam from the first area emitting towards the second area, and a second output beam from the second area emitting towards the first area;
        wherein a first central optical axis of the first output beam is intersected with a central boundary between the first illumination unit and the second illumination unit, and a second central optical axis of the second output beam is intersected with the central boundary.

11. The backlight module of claim 10, wherein the first area comprises a first divergent part and a first convergent part, a boundary of the first divergent part and the first convergent part points toward a position between a central axle of the first illumination unit and an adjacent edge of the second illumination unit.

12. The backlight module of claim 10, wherein the second area comprises a second divergent part and a second convergent part, a boundary of the second divergent part and the second convergent part points toward a position between a central axle of the second illumination unit and an adjacent edge of the first illumination unit.

13. The backlight module of claim 10, wherein at least one area of the first area and the second area is an aspheric shape or a hyperbolic shape.

14. The backlight module of claim 10, wherein the light guide plate further comprises a microstructural layer disposed on the lateral side of the hole structure, and used to diffuse the first output beam and the second output beam.

15. The backlight module of claim 10, wherein the lighting module further comprises a third illumination unit located between the first illumination unit and the second illumination unit, the lateral side of the hole structure further comprises a third area located between the first area and the second area and corresponding to the third illumination unit.

16. The backlight module of claim 15, wherein the third area is a plane shape or an arc shape.

17. The backlight module of claim 15, wherein the third area comprises two light guiding parts adapted to guide a third second output beam emitted by the third illumination unit respectively toward the first area and the second area.

18. The backlight module of claim 17, wherein a boundary of the two light guiding parts aligns with a central axle of the third illumination unit.

* * * * *